(12) United States Patent
Andre

(10) Patent No.: US 6,447,226 B1
(45) Date of Patent: Sep. 10, 2002

(54) SUPPORTING AND POSITIONING REAR STRUCTURE FOR VEHICLE TRANSPORTING CARS

(75) Inventor: Jean-Luc Andre, Obernai (FR)

(73) Assignee: Lohr Industrie, Hangenbieten (FR)

(*) Notice: Subject to any disclaimer, the term of this patent is extended or adjusted under 35 U.S.C. 154(b) by 0 days.

(21) Appl. No.: 09/674,784

(22) PCT Filed: May 19, 1999

(86) PCT No.: PCT/FR99/01186

§ 371 (c)(1),
(2), (4) Date: Nov. 6, 2000

(87) PCT Pub. No.: WO99/59839

PCT Pub. Date: Nov. 25, 1999

(30) Foreign Application Priority Data

May 20, 1998 (FR) ............................................. 98 06498

(51) Int. Cl.[7] .................................................. B60P 7/08
(52) U.S. Cl. ............................ 410/29.1; 410/24; 410/26
(58) Field of Search ........................... 410/24, 26, 29.1; 414/478, 495

(56) References Cited

U.S. PATENT DOCUMENTS

| | | | |
|---|---|---|---|
| 3,994,523 A | * 11/1976 | Harold | 410/29.1 |
| 4,221,422 A | 9/1980 | Harold | 410/26 |
| 4,239,275 A | 12/1980 | Horneys et al. | |
| 4,372,727 A | 2/1983 | Fredrickson et al. | |
| 5,067,862 A | * 11/1991 | Andre | 410/26 |
| 5,332,345 A | * 7/1994 | Lillard | 410/29.1 |
| 5,676,507 A | * 10/1997 | Lugo | 410/29.1 |
| 5,755,540 A | * 5/1998 | Bushnell | 410/29.1 |

FOREIGN PATENT DOCUMENTS

| | | |
|---|---|---|
| DE | 2 327 489 | 12/1973 |
| EP | 0 818 350 A1 | 1/1998 |
| FR | 1.605.260 | 11/1973 |
| FR | 2 290 325 | 6/1976 |
| FR | 2 455 527 | 11/1980 |
| FR | 2 455 528 | 11/1980 |
| GB | 888476 | 1/1962 |

* cited by examiner

*Primary Examiner*—Stephen T. Gordon
(74) *Attorney, Agent, or Firm*—Davis & Bujold, P.L.L.C.

(57) ABSTRACT

The support and positioning device is installed at the lower rear portion of a truck (2) or a trailer (3) of an articulated car carrier. It consists of a mechanical base and a support platform (10), the latter formed of an end support (9) and two moving surfaces (17) and (18). Moving surfaces (17) and (18) can move in translation and angularly either simultaneously or in succession. This invention is of interest to designers and manufacturers of car carriers.

19 Claims, 7 Drawing Sheets

SUPPORTING AND POSITIONING REAR STRUCTURE FOR VEHICLE TRANSPORTING CARS

FIELD OF THE INVENTION

The present invention relates to a support and positioning device for at least one of the cars transported by an articulated car carrier formed of a truck and one or more trailers, the device being installed in the lower rear position on the truck or the trailer.

BACKGROUND OF THE INVENTION

Due to cost factors throughout the general transportation industry, and particularly in the mass transport of automobiles, there is a high demand for both increased carrying capacity and improved methods of loading and unloading vehicles.

In response, manufacturers have designed and constructed car carriers with large capacity which will still meet other specific industry requirements. These include size restrictions imposed by highway regulations, technical imperatives relating to automobile dimension, the need to maintain a safe distance between vehicles during transport, and the safety of both personnel and vehicles during loading and unloading operations.

The lower platform of a truck, and particularly of a trailer truck, is generally shorter than the upper platform due to the presence of the cab.

The following is a description of conventional loading operations.

The lower loading platform has local recesses in some areas which engage one of the wheels of the lower car near the truck cab, thus freeing a large amount of space near the top. This space is used to receive the nose of the next vehicle, which is pointed down and towards the rear, supported by an individual ramp known as the stacking ramp.

This arrangement means that the rear end of the first vehicle carried by the lower platform of the trailer is angled up toward the rear while supported by a hydraulic stacking ramp.

This configuration, shown in FIG. 11, illustrates the prior art technique.

This technique has three major disadvantages.

It requires adaptations in the wheel base of the truck and the formation of recesses in the areas often selected by truck manufacturers to house such equipment and accessories as the fuel tank, batteries, compressed air tank, and so forth.

The rear stacking ramp on the truck, which is inclined before access to the car is gained, offers very poor visibility to the surrounding area, making vehicle access difficult and posing a danger to workers and the car.

The hydraulic stacking ramp necessary at the front of the trailer is a significant extra expense.

SUMMARY OF THE INVENTION

The general aim of the invention is to maximize use of the loading space by making better use of the spaces formed by the overlapping vehicles between the truck cabin and the rear of the last trailer.

A first specific goal of the invention is the safe, quick loading and unloading of vehicles, combined with improved use of the space between the rear of the truck and the beginning of the trailer, while facilitating and reducing the number of loading and unloading operations.

A second specific goal is improving safety of loading and unloading operations, particularly for the car placed at the rear of the truck, not only worker safety but also vehicle security since visibility from the lower rear vehicle on the truck was very poor in previous systems.

The basic principle of the invention is to load the last vehicle on the lower truck platform in an inclined position so that it is partially above the first lower vehicle on the trailer.

The individual support device for a car carrier according to the invention offers numerous advantages, which are primarily as follows:

elimination of the hydraulic stacking ramp on the trailer;

it becomes useless to form spaces in the wheelbase of the truck and to risk displacing equipment and useless to form recesses designed to lower at least one of the wheels of the vehicle being transported near the cab onto the lower loading platform;

improved vehicle and personnel safety, since it possible to load the rear vehicle onto the lower truck platform under good visibility conditions;

the rear vehicle on the lower truck platform can be loaded in a flat position using the invention, which allows easy access, as the device the vehicle to be definitively placed a second time;

the support device can be used as a ramp for vehicle access at the rear of the truck if the truck is used alone;

the support structure serves as a bridge between the truck and the trailer during the loading and unloading operations;

improved manufacture, since the support structure is universal and can be mass-produced;

optimal loading capacity;

improved distribution of the load on the truck due to the new arrangement of vehicles;

versatility, since the old configurations remain possible, while the invention offers new possibilities.

BRIEF DESCRIPTION OF THE DRAWINGS

Other characteristics and features of the invention will be apparent from the following description given by way of non-limiting example, with reference to the drawing, wherein.

DESCRIPTION OF THE PREFERRED EMBODIMENTS

Figure 1:
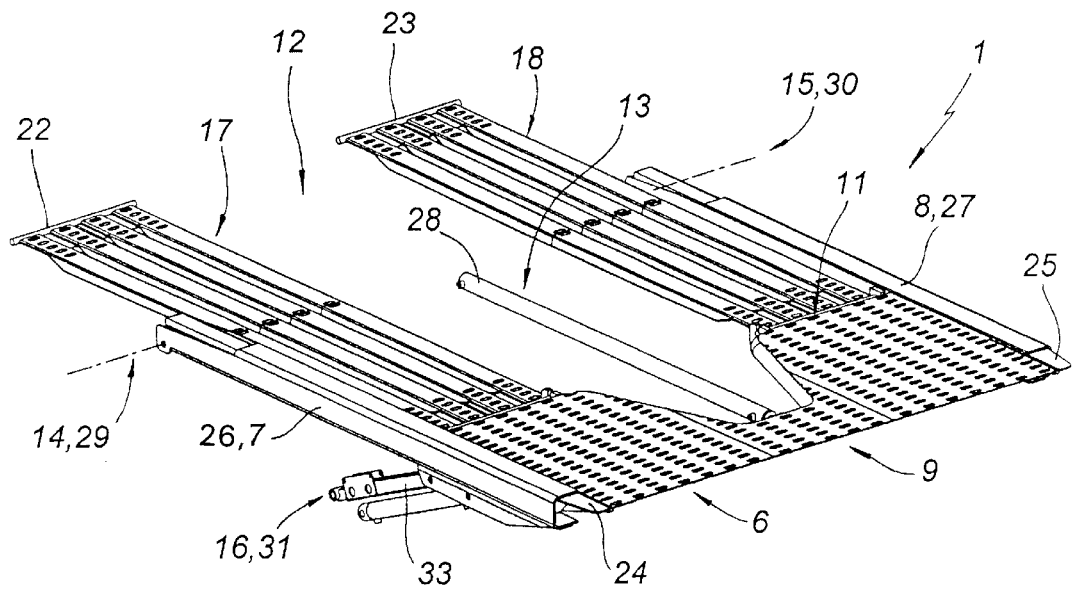
FIG. 1 is a ¾ overhead perspective of the first variation.

The invention is based on the general inventive concept of attaching a support and positioning device 1 for receiving a vehicle to be transported, to the lower rear loading platform of a truck 2 or car carrier trailer 3, and more specifically, to the intermediate trailer(s) of a heavy truck. The device 1 forms a mechanical support structure that can move as a unit in simple or combined translation-inclination motions. This unit is designed to improve use of the rear space 4 of the truck 2 and the front space 5 of the trailer or one of the trailers attached to a heavy truck in order to achieve the goals and confer the advantages enumerated below.

Generally speaking, support device 1 comprises a rigid mechanical base 6 composed of two struts 7 and 8, the ends of which are integral with an end support 9 constituting the extremity of a support platform 10 which receives the vehicle to be transported. In its simplest version, the platform is formed of a single piece, but in other cases it may be formed of two flat pieces pivotably articulated to each other by a hinge-type articulation 11. There is an end support 9 and a double inclinable ramp 12. The entire platform 10, which is supported by the mechanical base 6 and attached to it, can be displaced in translation along the longitudinal axis of the truck 2 due to the action of a translational drive means 13, for example, a cylinder drive means consisting of a pair of hydraulic or mechanical cylinders, and another portion rotating around the transverse axis at the ends 14 and 15, and it can also be angled using device 16 which raises and inclines the ends of the struts. Thus, the entire unit moves using by combining these two basic movements: translation and inclination.

The length of end support 9 may essentially vary from the width of a simple traverse piece to the total platform length.

The double inclinable ramp 12 is formed by two parallel or flat moving surfaces 17 and 18 on top of which the two front wheels 19 or rear wheels 20 of a transported vehicle 21 are supportably positioned.

Base 6 is a mechanical unit attached to the truck chassis by one of the carriage elements. As indicated above, it is movable both in translation and angularly, allowing it to change position according to its function: loading, transportation, unloading . . . .

Next, each variation is described in detail with references to FIGS. 1 through 6.

Figure 2:
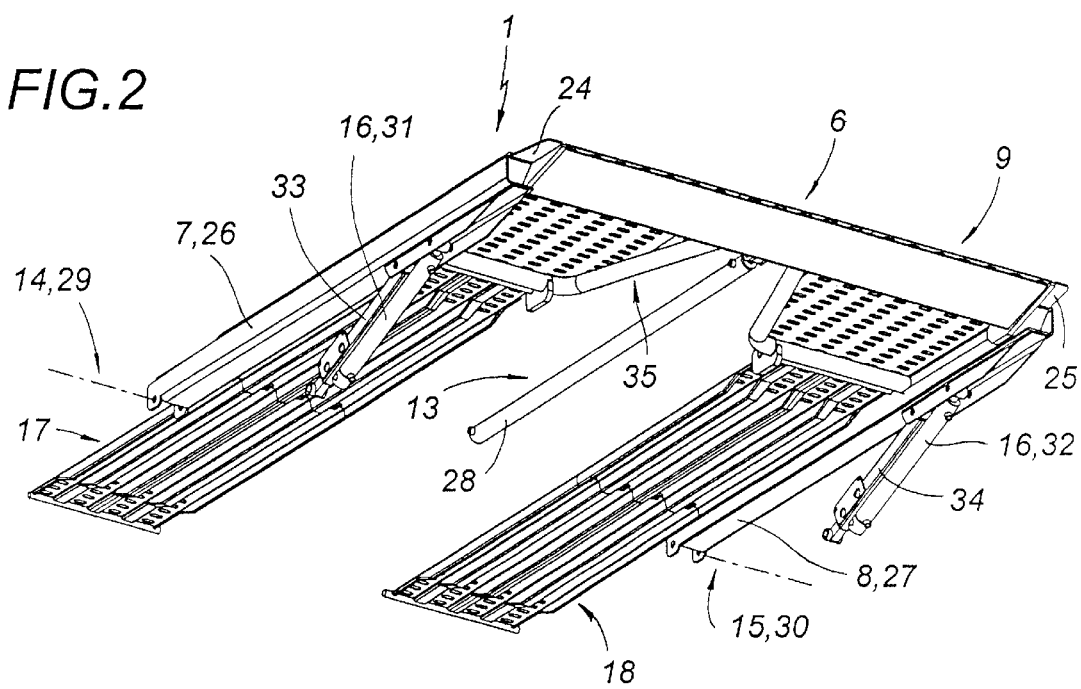
FIG. 2 is a ¾ perspective from below of the first variation.

According to the first variation, shown in FIGS. 1 and 2, platform 10 is made of two inter-articulated portions: first, an end support 9, comprising two lateral tracks and second, a double ramp 12 consisting of two moving surfaces 17 and 18. The latter are each pivotably articulated at one end by a hinge-type pivot articulation 11.

The free ends of moving surfaces 17 and 18 each terminate in a respective transverse element 22 and 23, each of which is designed to form a sliding or rolling element contacting a flat surface integral with the chassis of the truck 2 used as a displacement support. This sliding or rolling contact and the motion caused by inclining motor 16 controls the angle of moving surfaces 17 and 18.

End support 9 of platform 10 is displaced longitudinally by its lateral struts 24 and 25 along slides 26 and 27 by means of a central translational cylinder 28. The front extremity of each slide 26 or 27 is pivotably articulated to a respective fixed end axle 29 and 30 disposed transverse to the chassis of truck 2.

End support 9 is integral with the two lateral struts 24 and 25.

The unit can be inclined using two cylinders 31 and 32, each provided on one side below slides 26 and 27. Each cylinder is reinforced in parallel by a brace 33 or 34, respectively, which is pivotably attached and extendible near the corresponding cylinder.

Inclining cylinders 31 and 32 and associated braces 33 or 34 are pivotably articulated first to the sub-surface of slides 26 and 27, for example, near one of their extremities, and second by the fixed end axles 29 and 30 to an element integral with the chassis of truck 2.

In the underside view (FIG. 2) note there is a tubular structure 35 reinforcing end support 9.

Figure 3:
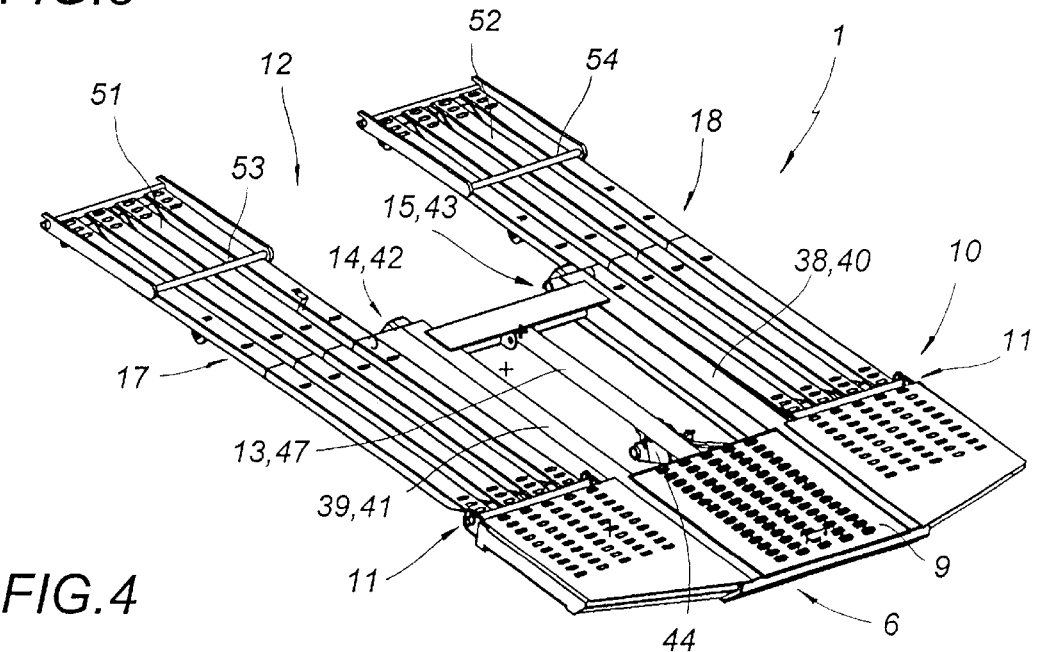
FIG. 3 is a ¾ overhead perspective of the second variation in the flat position.
Figure 4:
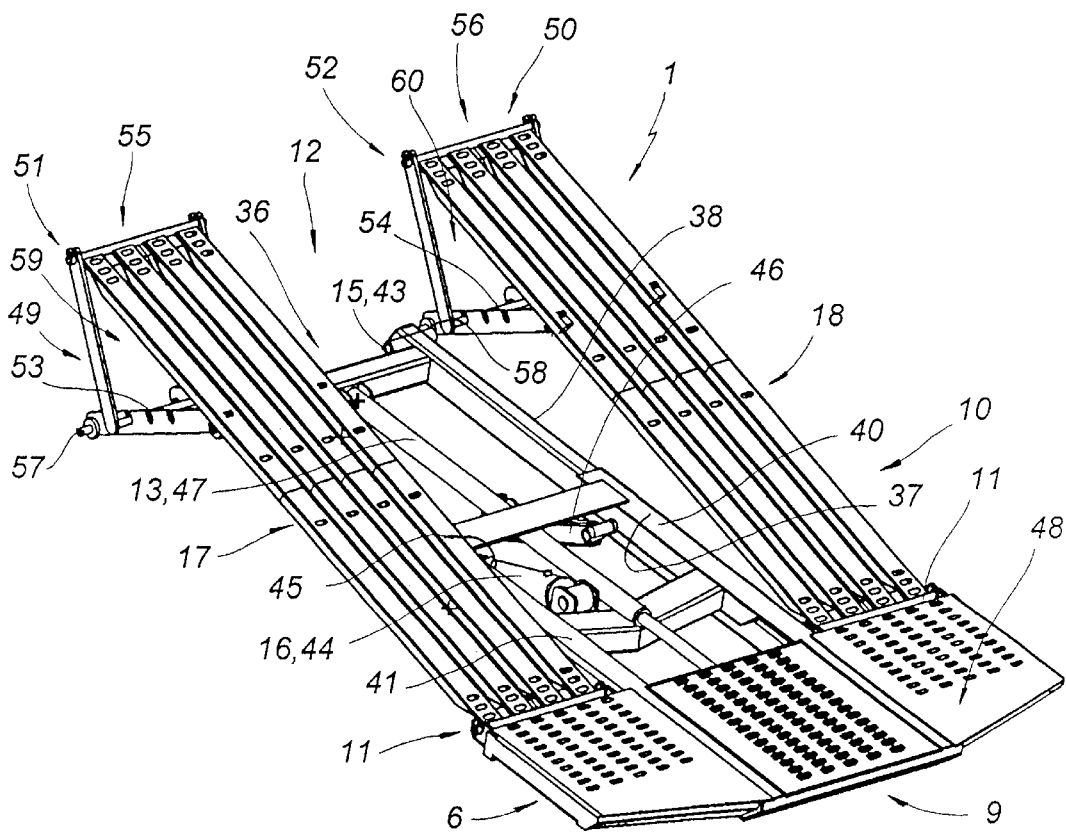
FIG. 4 is a ¾ overhead perspective of the second variation in the raised position.

The second variation shown in FIGS. 3 and 4 is based on the same inventive concept to the extent that the entire structure moves both in translation and angularly, and loading platform 10 is either formed of a single piece or split into two parts 9 and 12 pivotably articulated to each other with a hinge type articulation 11, and to the extent there exists at the end of the moving surfaces 17 and 18 a contact element which slides or rolls along a surface integral with the truck chassis.

As shown, the mechanical base 6 of support structure 1 is formed, in this variation, by a first frame 36 and a second frame 37 which slide inside each other when their respective struts 38, 39 and 40, 41 engage. The first frame 36 tilts on two fixed end axles 42 and 43 which are transverse to the truck and attached to a support integral with the truck chassis. The first frame 36 is activated by an inclining cylinder 44 reinforced with two lateral braces 45 and 46. The first frame 36 supports the second frame 37 which slides longitudinally in translation along struts 38, 39 in the first frame when activated by translational cylinder 47 attached to the first frame 36.

Second frame 37 holds, by end support 9, at its free end a flat element 48 shown in the drawings in three sections joined to each other; the purpose of element 48 is to support the two front or rear wheels 19 or 20 of a vehicle being transported 21.

End support 9 is pivotably articulated by hinge 11 to form a double inclinable ramp 12 formed by two moving surfaces 17 and 18 which may be manually inclined using two graduated supports 49 and 50 which, together with two pairs 51 and 52 of oblique supports joined to a respective cross piece 53 and 54, form a triangular mechanism 55 and 56 of variable angular width. The triangular elements 55 and 56 can be retracted by positioning them alongside and below the free ends of the moving surfaces 17 and 18 as shown in FIG. 3. In this configuration graduated supports 49 and 50 are positioned beneath the supporting surfaces.

The above description concerns the version with two separate moving surfaces. The platform can also be made of a single piece.

Moving surfaces 17 and 18 each slide or roll along a contact surface integral with the chassis of truck 2 at their free extremities or at the graduated supporting extremities 49 and 50 when they are in use. In this case, in order to allow displacement along said contact surfaces, the ends of graduated supports 49 and 50 are each equipped with a cross piece 57 or 58 forming a support-axle for movement, and are each provided with a means of locomotion 59 or 60, for example, a pair of small wheels.

This variation offers a wide variety of possibilities for displacement and angular adjustment due to the combination of translational movement, inclination of the unit, and manual adjustment of the angle of platforms 17 and 18.

Figure 5:
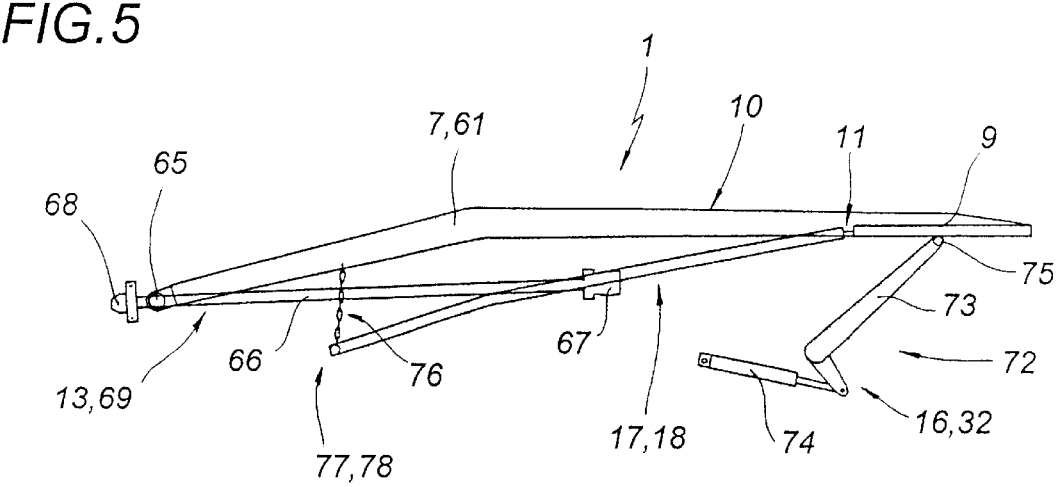
FIG. 5 is schematic outline of a third variation in which translational movement is actuated by a screw-pin unit.
Figure 6:
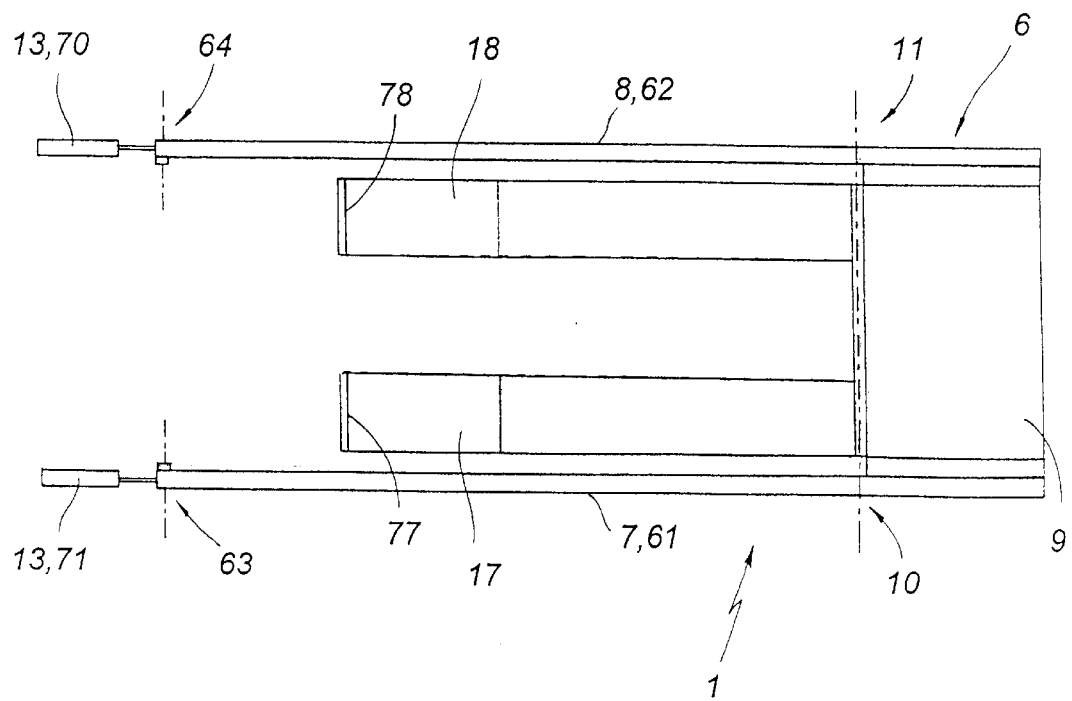
FIG. 6 is a schematic outline of a third variation in which translational movement is actuated by hydraulic cylinders.
Figure 7:
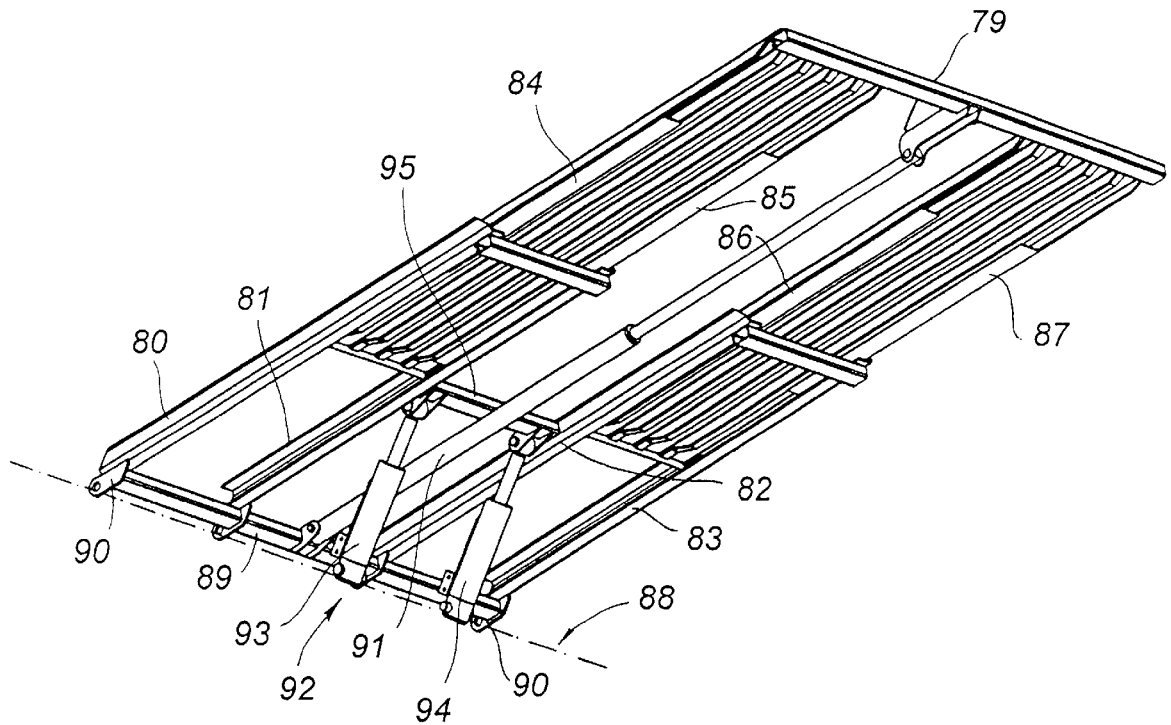
FIG. 7 is a perspective of a supplementary variation with connected moving platforms, which are shown inclined with the moving surfaces extended.
Figure 8:
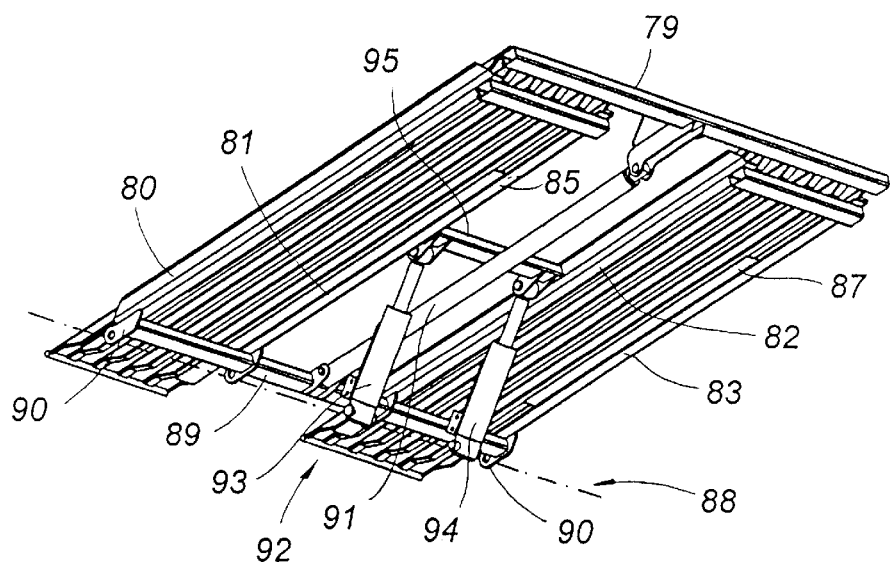
FIG. 8 is a perspective of the same variation as FIG. 7 shown inclined with the moving surfaces retracted.

The third variation shown in FIGS. 5 and 6 is also based on the same general inventive concept to the extent that device 1 is placed in the rear position on the lower loading surface of the truck or trailer of a car carrier and that entire unit moves translationally and angularly, and has a mechanical base 6 formed of two struts 7 and 8 and an end support 9 integral with the strut extremities.

Struts 61 and 62 on mechanical base 6 in this variation are specialized in shape because they have two slanted sides to facilitate disengagement in a certain configuration. Said mechanical base 6 inclines or is completely raised on two angled axles 63 and 64 transverse to the truck, each located on a screw-block such as 65 pivotably connected to each free extremity of each strut 61 or 62. The screw in each screw-block 65 is supported by a pin such as pin 66 extending between a hydraulic rotary drive motor such as motor 67 and an end bearing such as bearing 68, together constituting a mechanical cylinder such as cylinder 69.

Inclinable pivot axles 63 and 64 are each moved in translation by a group of two hydraulic cylinders 70 and 71 (variation shown in FIG. 6) or by displacing the screw in mechanical cylinders 69. This movement provides translational movement along an axle longitudinal to the vehicle.

As in the other variations, end support 9 is integral with each extremity of struts 61 and 62. The free end of the mechanical base can be raised and lowered using an exterior angling device 72, for example, at least one articulated lifting arm 73 actuated by a cylinder 74, said arm having a small end wheel 75 cooperating with the subsurface of end support 9 or the lower portion of struts 61 and 62 for the purpose of raising or lowering one or more of these elements.

The end support 9, if it is long enough, can support two of the front wheels 19 or rear wheels 20 of a vehicle 21 being transported. Double inclining ramp 12 is pivotably articulated, for example with hinge 11, to end support 9. In the version shown, it is manually inclinable and for this purpose it is attached near its free ends by a connector or other retaining device 76 so as to be adjustable relative to struts 61 and 62 on chassis 12. Furthermore, these free ends are equipped with elements 77 and 78 allowing them to roll or slide along a surface integral with the chassis.

Ramp 12 is equipped with said means for rolling or sliding in the variation where end support 9 is made in the form of a simple end traverse piece.

Note that in all the variations, moving surfaces 17 and 18 can be extended by using retractable extension pieces, which can be folded back or detached, the free extremities of which are equipped with the same means of rolling or sliding along a surface integral with the truck chassis.

The supplemental variations shown in FIGS. 7 through 10 proceed from the same general inventive concept, which consists of providing an individual rear support and positioning device for a car carrier, which individual device moves in either a simple or compound motion resulting in either translational movement along the longitudinal axis of the vehicle, or angular movement on an axle transverse to the vehicle, or a combination of the two preceding basic movements until the definitive transport position is attained, permitting improved use of the space in rear end of the truck and the front end of the trailer.

Figure 9:
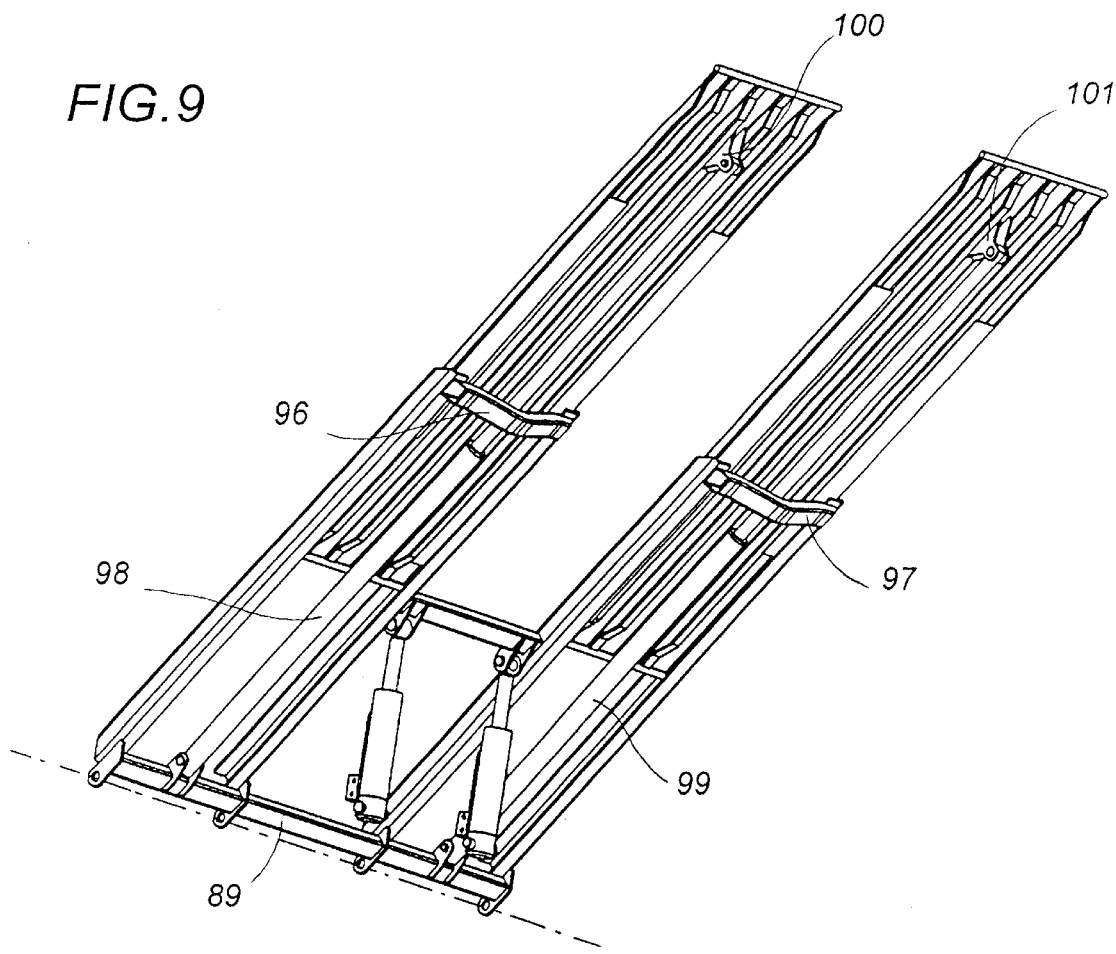
FIG. 9 is a perspective of another supplementary variation with independent moving surfaces and a common angling mechanism.
Figure 10:
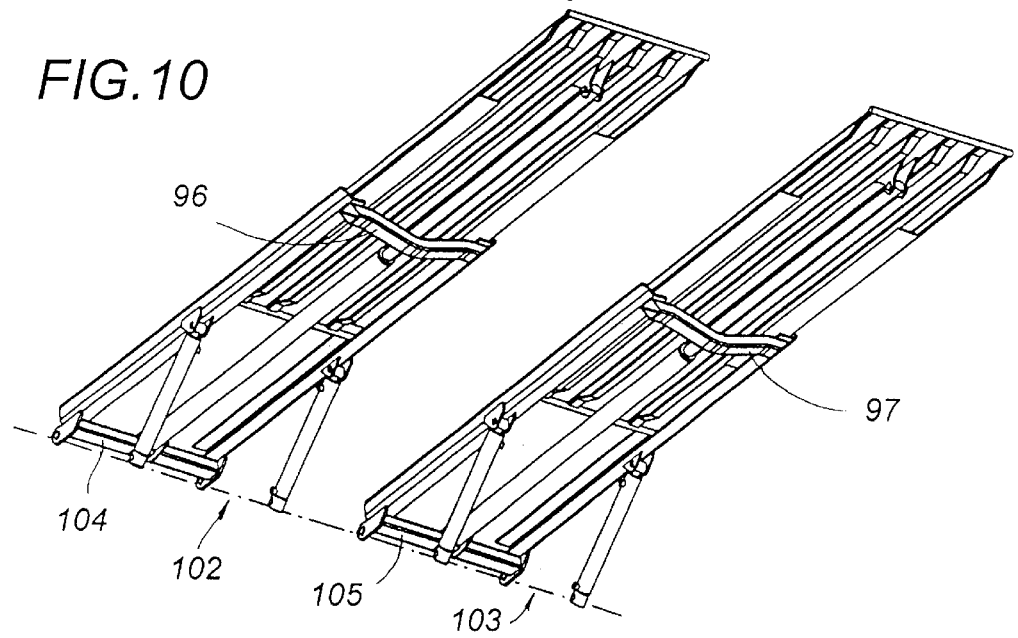
FIG. 10 is a perspective of yet another supplementary variation with independent moving surfaces and separate angling mechanisms.

Among the supplemental variations there are a supplemental variation having dual moving surfaces (FIGS. 7 and 8) and two supplemental variations having independent moving surfaces and either a common inclining device (FIG. 9) or separate devices (FIG. 10).

According to the first variation, moving surfaces 17 and 18 are connected by means of an end traverse support 79 constituting end support 9. Moving surfaces 17 and 18 constitute a double ramp 12 supported translationally by an inclinable supporting base formed of two pair of slides 80, 81 and 82, 83, each pair being associated with one of the moving surfaces 17 or 18.

In the version shown, struts 84, 85 and 86, 87 border each moving surface and cooperate with slides 80 through 83 during translational movement.

The support base is inclinable about a geometric axis 88 transverse to the vehicle and parallel to an articulating traverse support 89 extending between articulation supports 90.

Double ramp 12 is displaced in translation due to the action of a longitudinal cylinder 91 located between end traverse support 79 and articulating traverse support 89.

A drive means 92 for driving angular movement, consisting, for example, of a pair of cylinders 93 and 94 articulated between a fixed support on the vehicle and a transverse element 95 integral with opposing slides 81 and 82, inclines the unit.

The remaining supplemental variations (FIGS. 9 and 10) have independent moving surfaces 17 and 18 which slide along slide elements that are interconnected first, by a convex connecting support 96 or 97 at the rear extremity, and second, by articulating traverse support 89.

Individual mechanical translation cylinders 98 and 99 are attached to each moving surface 17 and 18 between articulating traverse support 89 and an activating point 100, 101 on the shaft of the translation cylinder located on the subsurface at the end of each moving surface. This activation point may take the form of a pivot articulation as shown in FIG. 9.

The angular displacement drive means is either made as before, in the form of a pair of cylinders acting upon a transverse element 95 (FIG. 9), or as a single cylinder, or two independent pairs 102 and 103 of cylinders each articulated between a fixed point on the vehicle chassis and the corresponding slide (FIG. 10). In the latter variation, articulating traverse support 89 is separated into two portions 104 and 105.

It is apparent that in variations 9 and 10 with moving surfaces that move independently in translation (and in the latter variation, are also independently inclinable), the translational movements of the two moving surfaces 17 and 18 must be synchronized. In the second variation, angular movement must also be synchronized.

Figure 15:
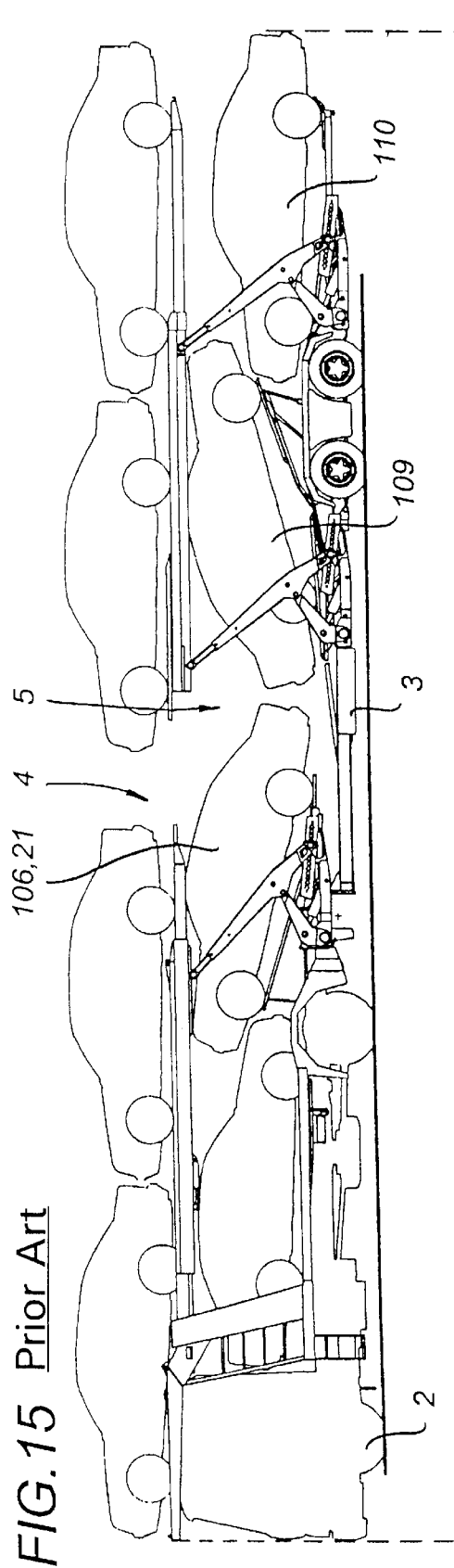
FIGS. 15 and 16 are comparative views in profile of a car carrier vehicle with a conventional support structure and a support structure according to the invention, respectively, on the lower rear portion of the truck.
Figure 16:
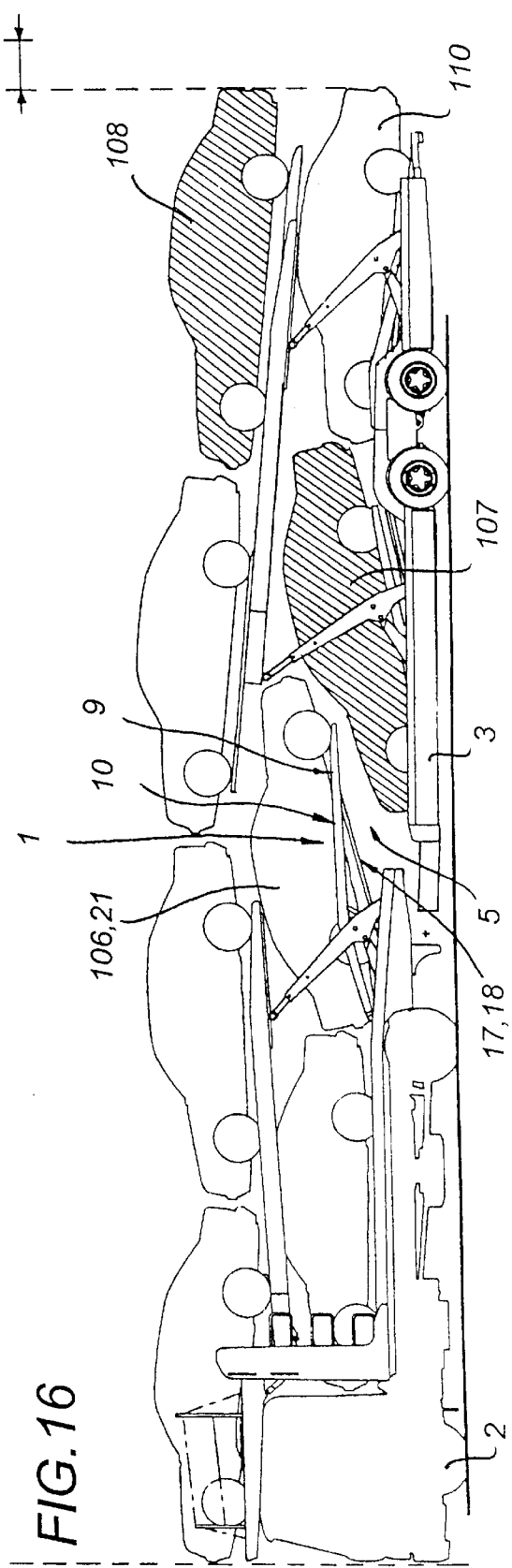

FIGS. 15 and 16 illustrate one of the principal advantages of the invention.

Two important differences are apparent in the loading capacity of the same car carrier 2 depending upon whether or not it is equipped with the individual support device of the invention.

Because the last car 106 on the lower loading platform on the rear extension is angled upward, the respective lengths of the same loaded vehicle differ by a diminution in length "DL" in favor of the vehicle possessing the supporting structure according to the invention, while still permitting at least one larger vehicle 107 to be loaded onto the lower loading platform or even a still larger vehicle 108 at the end of the trailer. These larger cars appear in the cross-hatched areas on FIG. 16.

FIGS. 15 and 16 show in a simple, convincing format how the gain in capacity is achieved by using support device 1 of the invention.

Figure 12:
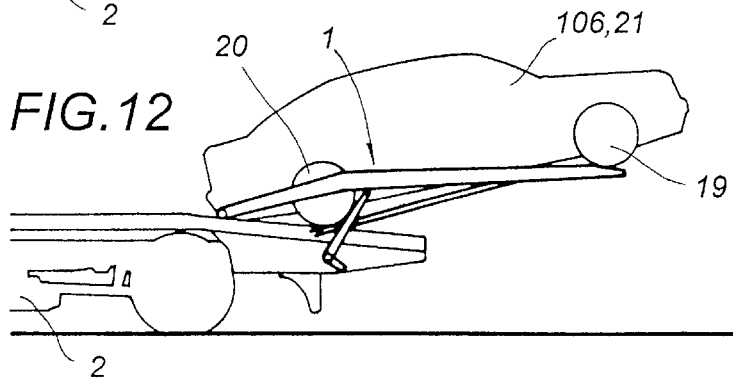

The two cars 109 and 110 on the lower loading platform of trailer 3 in the conventional loading system (FIG. 15) are displaced toward the front. As a result, it becomes possible to place a larger car model 107 in the lower front position on the trailer, and to accept a larger size model 108, for example, at the upper rear position, keeping the same car 110 at the rear while decreasing by "DL" the length by which the loaded vehicle projects. These advantages allow the user greater latitude in loading, while still respecting the rules of the application, and make it possible to profitably transport larger size cars, as shown by the dotted line extensions (FIG. 12).

However, the invention is not limited solely to these advantages.

As can be observed in FIGS. 11 through 14, support device 1 of the invention can serve different purposes.

Figure 11:
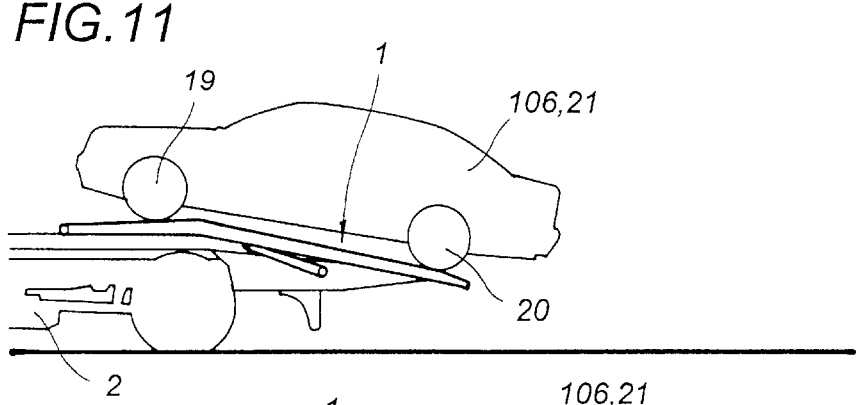
FIGS. 11 through 14 are schematic drawings illustrating use of the rear structure showing various positions; the last drawings, 13 and 14, respectively, show an application as a bridge and as an access ramp.

In two configurations it is used as a carrier. In the first configuration the transported vehicle 21 is loaded on the rear of truck 2 in a forward-facing position, for example, in the case of a single transport truck (FIG. 11).

The second configuration is that of a trailer car carrier 3 with the transported vehicle 21, 106 raised and facing backwards at the rear of the vehicle, forming a space beneath the transported vehicle which can be used to accommodate vehicle 107 in the lower front position on the trailer (FIG. 12).

Figure 13:
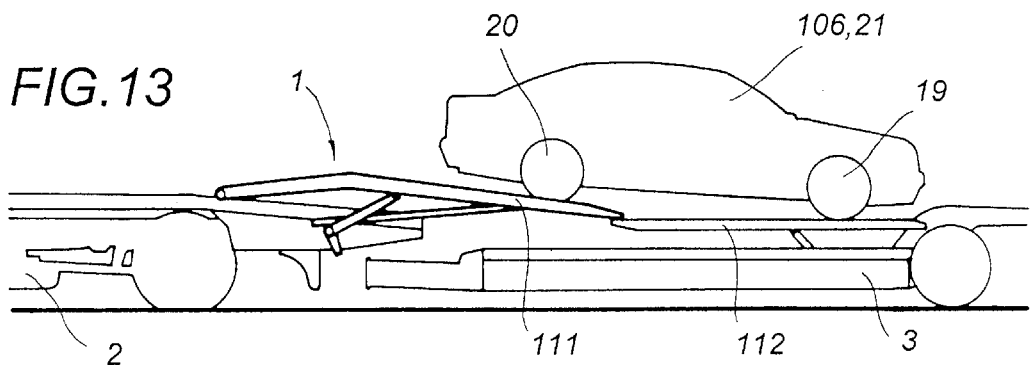
Figure 14:
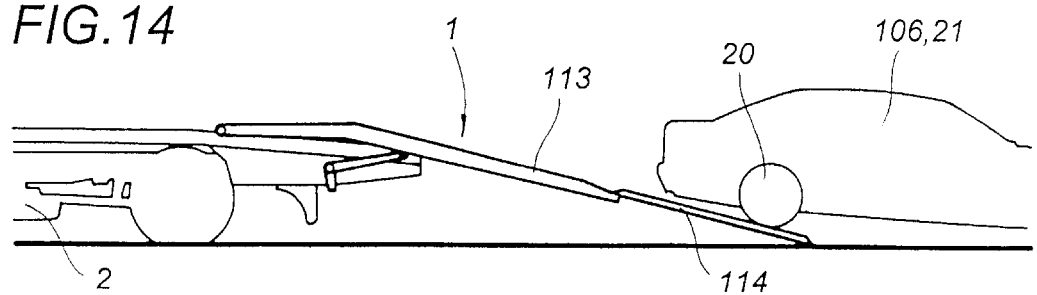

The device of the invention also serves as a bridge platform 111 between truck 2 and trailer 3 when support structure 1 is in the lowered position; the device is then projected rearward to serve as a connecting element between the rear of truck 2 and possibly the platform 112 of a trailer 3 (FIG. 13).

A final use (FIG. 14) concerns configuration as an ascending or descending ramp 113 at the rear of truck 2. For this purpose, access ramp 113 extends into a loading rail 114 descending continuously to the ground along the same plane.

What is claimed is:

1. A device (1) for supporting and positioning at least one vehicle to be transported by an articulated vehicle carrier comprising one of a truck (2) and a trailer (3), the device (1) being installed adjacent a lower rear end of the vehicle carrier to facilitate transportation of the vehicle;
    wherein the device (1) comprises a mechanical base (6) and a support platform (10) comprising two moving surfaces (17 and 18) each having a first extremity thereof connected with an end support (9), and the device (1) being at least one of:
    (1) moveable in a translation direction along a longitudinal axis of the vehicle carrier by translation mean interconnecting the support platform (10) with the articulated vehicle carrier;
    (2) moveable in an angular direction with respect to the articulated vehicle carrier by inclining means interconnecting the mechanical base (6) with vehicle carrier, and the mechanical base (6) has at least one pivot axle which extends transverse to the vehicle carrier to facilitate the angular movement of the device; and
    (3) moveable both in the translation direction along the longitudinal axis of the vehicle carrier, by the translation means, and moveable in the angular direction relative to the vehicle carrier, by the inclining means;
    so that the device is moveable into a transport position in which a rearward facing extremity of the device is tilted upward relative to the vehicle carrier to improve usage of space provided at the lower rear end of the vehicle carrier and space provided at a front end of a tow trailer (3) connected to a rear end of the vehicle carrier.

2. The support device according to claim 1, wherein the support platform (10) comprises a single piece which includes the two moving surfaces (17 and 18).

3. The support device according to claim 2, wherein the moving surfaces (17 and 18) are separated by a groove.

4. The support device according to claim 2, wherein the first extremities of the two moving surfaces (17 and 18) are each pivotally articulated to the end support (9).

5. The support device according to claim 1, wherein an opposed second extremity of each one of the two moving surfaces (17 and 18) is equipped with an element for one of rolling and sliding the second extremity of the two moving surfaces (17 and 18) along a surface integral with the chassis of the vehicle carrier.

6. The support device according to claim 2, wherein the two moving surfaces (17 and 18) can be raised relative to the vehicle carrier.

7. The support device according to claim 1, wherein the end support (9) includes a reinforced structure.

8. The support device according to claim 1, wherein the mechanical base (6) comprises two struts (7, 8) and the end support (9) is formed integral with the two struts.

9. The support device according to claim 1, wherein the translation means, for providing translational movement of the device, comprises one of a mechanical cylinder and a hydraulic cylinder which interconnects the device (1) with the articulated vehicle carrier.

10. The support device according to claim 1, wherein the mechanical base (6) has a plurality of pivot axles, and the inclining means, for providing pivoting movement, pivots the device (1) about the plurality of pivot axles which are integral with a chassis of the vehicle carrier.

11. The support device according to claim 10, wherein means are provided for moving the plurality of pivot axles in the longitudinal direction of the vehicle carrier.

12. The support device according to claim 1, wherein the pivoting movement, via the inclining means, occurs by one of raising a first extremity of the mechanical base (6) and lowering an opposite second extremity of the mechanical base (6).

13. The support device according to claim 1, wherein the translational movement of the support platform (10) occurs by sliding the support platform (10) relative to a plurality of slide elements supporting the support platform (10).

14. The support device according to claim 11, wherein the mechanical base (6) comprises two parallel struts which each have first extremities that are linearly displaceable along the longitudinal axis of the vehicle carrier and have opposite second extremities that are inclinable by the inclining means, and the inclining means comprises an articulated arm which is actuated by a cylinder and interconnects the second extremities of the struts with the vehicle carrier; and the first extremities of the two moving surfaces (17 and 18) are pivotally connected with the end support (9) and a second extremity of each one of the two moving surfaces (17 and 18) is connected to one of the two parallel struts by an adjustable retaining device.

15. A device (1) for supporting and positioning at least one vehicle to be transported by an articulated vehicle carrier comprising one of a truck (2) and a trailer (3), the device (1) being installed adjacent a lower rear end of the vehicle carrier to facilitate transportation of the vehicle;

wherein the device (1) comprises a mechanical base (6) and a support platform (10) comprising two moving surfaces (17 and 18) and the device (1) being:

(1) moveable In a translation direction along a longitudinal axis of the vehicle carrier by at least one longitudinal cylinder interconnecting the support platform (10) with the articulated vehicle carrier; and (2) moveable In an angular direction with respect to the articulated vehicle carrier by at least two cylinders interconnecting the mechanical base (6) with vehicle carrier, and the mechanical base (6) has at least one pivot axle which extends transverse to the vehicle carrier to facilitate the angular movement of the device;

so that the device is moveable into a transport position in which a rearward facing extremity of the device Is tilted upward relative to the vehicle carrier to improve usage of space provided at the lower rear end of the vehicle carrier and space provided at a front end of a tow trailer (3) connected to a rear end of the vehicle carrier;

the mechanical base (6) comprising two pairs of slides and each of the pairs of slides being pivotally supported at one extremity thereof by a chassis of the vehicle carrier, the at least two cylinders Interconnecting a remote region of the slides with the chassis to facilitate inclining of the two pair of slides relative to the vehicle carrier, a first pair of the slides (80, 81) supports a first one of the two moving surfaces (17) and a second pair of the slides (82, 83) supports a second one of the two moving surfaces (18), and the at least one longitudinal cylinder being connected to a free end of the two moving surfaces (17 and 18) to move the support platform (10) in the translation direction.

16. The support device according to claim 11, wherein the mechanical base (6) comprises a first frame and a second frame slidable relative to one another, with a first frame supporting the second frame and the second frame supporting one extremity of the support platform (10), the second frame is translationally movable relative to the first frame when the translation means is actuated, the first frame is pivotable relative to the vehicle carrier when the inclining means is actuated, the first extremities of the two moving surfaces (17 and 18) are pivotably articulated to the support platform (10), and a second extremity of each of the two moving surfaces (17 and 18) has a variable angle support.

17. The support device according to claim 16, wherein each variable angle support comprises a graduated support with a plurality of notches and a mating oblique support with a cross piece, a first extremity of the graduated support is pivotally attached to a lower surface of one of the two moving surfaces and a second extremity of the graduated support has means for movement along a chassis surface of the vehicle carrier;

a first extremity of the oblique support is pivotally attached to a lower surface of one of the two moving surfaces and the cross piece is supported at a second extremity of the oblique support for engagement with one of the plurality of notches of the graduated support;

the graduated support and the oblique support both having a retracted position and an in use position in which the cross piece of the oblique support engages with a desired one of the plurality of notches of the graduated support for inclining the two moving surfaces (17 and 18) relative to the first and second frames.

18. The support device according to claim 1, wherein the moving surfaces (17 and 18) are mechanically independent during translation movement.

19. The support device according to claim 1, wherein the moving surfaces (17 and 18) are mechanically independent both during translation movement and during angular movement.

* * * * *